United States Patent
Song et al.

(10) Patent No.: US 9,046,630 B2
(45) Date of Patent: Jun. 2, 2015

(54) OPTICAL SHEET AND BACKLIGHT ASSEMBLY HAVING THE SAME

(71) Applicant: Samsung Display Co., Ltd., Yongin, Gyeonggi-Do (KR)

(72) Inventors: Hyun-Hwa Song, Suwon-Si (KR); Kang-Woo Lee, Seoul (KR); Ki-Se Lee, Yongin-Si (KR); Jin-Sung Choi, Cheonan-Si (KR); Sang-Woo Ha, Yongin-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 147 days.

(21) Appl. No.: 13/835,661

(22) Filed: Mar. 15, 2013

(65) Prior Publication Data
US 2014/0126236 A1    May 8, 2014

(30) Foreign Application Priority Data

Nov. 7, 2012    (KR) .......................... 10-2012-0125163

(51) Int. Cl.
G02B 6/36    (2006.01)
F21V 8/00    (2006.01)

(52) U.S. Cl.
CPC ............ *G02B 6/0036* (2013.01); *G02B 6/0038* (2013.01); *G02B 6/0041* (2013.01); *G02B 6/0061* (2013.01)

(58) Field of Classification Search
CPC .. G02B 6/0036; G02B 6/0043; G02B 6/0051; G02B 6/0053; G02B 6/0038; G02B 6/0041; G02B 6/0061

USPC .................................. 362/620, 339, 340, 337
See application file for complete search history.

(56) References Cited

U.S. PATENT DOCUMENTS

2008/0310171 A1* 12/2008 Hiraishi et al. ............... 362/339
2010/0007821 A1*  1/2010 Choi et al. ...................... 349/64
2010/0110331 A1*  5/2010 Han et al. ........................ 349/62

FOREIGN PATENT DOCUMENTS

| JP | 06-110051 | 4/1994 |
|----|-----------|--------|
| JP | 2009-018461 | 1/2009 |
| KR | 10-2008-0020842 | 3/2008 |
| KR | 10-2011-0066480 | 6/2011 |

OTHER PUBLICATIONS

English Abstract for Publication No. 10-2008-0020842.
English Abstract for Publication No. 2009-018461.
English Abstract for Publication No. 06-110051.
English Abstract for Publication No. 10-2011-0066480.

* cited by examiner

*Primary Examiner* — Anne Hines
(74) *Attorney, Agent, or Firm* — F. Chau & Associates, LLC

(57) ABSTRACT

An optical sheet includes a base film, a prism pattern formed in a first area of the base film, and a diffusion member formed in a second area of the base film. The prism pattern has a plurality of parallel prisms on a light-exiting surface. The diffusion member includes a plurality of scatter members in the base film to scatter light, or a plurality of irregularly arranged lenses on one or more of the light-incident surface and the light-exiting surface.

18 Claims, 8 Drawing Sheets

OPTICAL SHEET AND BACKLIGHT ASSEMBLY HAVING THE SAME

This application claims priority under 35 U.S.C. §119 from Korean Patent Application No. 10-2012-0125163, filed on Nov. 7, 2012 in the Korean Intellectual Property Office, the contents of which are herein incorporated by reference in their entirety.

BACKGROUND

1. Technical Field

Exemplary embodiments of the disclosure are directed to an optical sheet and a backlight assembly having the optical sheet. More particularly, exemplary embodiments of the disclosure are directed to an optical sheet and a backlight assembly for reducing light-leakage and hot spots around light sources.

2. Discussion of the Related Art

In general, a liquid crystal display ("LCD") device adjusts an amount of light transmitted through an upper substrate, a lower substrate, and a liquid crystal layer therebetween to display an image. An LCD device includes a light source to provide light toward a display panel including the upper substrate, the lower substrate, and the liquid crystal layer. The light source may be mounted on a backlight assembly. The backlight assembly may be categorized into a direct-illumination type or an edge-illumination type according to a position which the light source is disposed. In a direct-illumination type, a lamp disposed on a rear surface of the display panel emits light directly toward the display panel. In the edge-illumination type, a lamp disposed adjacent to a side surface of a light guide plate emits light toward the light guide plate guiding the light toward the display panel.

In the edge-illumination type backlight assembly, a plurality of optical sheets may be disposed between the light guide plate and the display panel to improve luminance uniformity of the light from the light guide plate. In general, the optical sheets include at least one diffusion sheet and two prism sheets.

However, when using optical sheets, including a diffusion sheet and prism sheets, light-leakage can occur around the light sources disposed adjacent to the side surface of the light guide plate. In addition, luminance distribution is non-uniform, with high luminance in portions of the optical sheets adjacent to the light sources and low luminance in a portion of the optical sheet corresponding to areas between the light sources, resulting in hot spots.

SUMMARY

One or more exemplary embodiments of the disclosure provide an optical sheet and a backlight assembly having the optical sheet for reducing light-leakage and hot spots around light sources.

In an exemplary embodiment of an optical sheet according to the disclosure, the optical sheet includes a base film, a prism pattern formed on a light-exiting surface in a first area of the base film, and a diffusion member formed in a second area of the base film. The prism pattern has a plurality of prisms, and the diffusion member plurality of scattering members within the base film configured to scatter incident light.

In an exemplary embodiment, the diffusion member may include a lens pattern having a plurality of irregularly arranged lenses.

In an exemplary embodiment, the lens pattern may be formed on a light incident surface of the second area, and the prism pattern may be formed on the light-exiting surface of the second area.

In an exemplary embodiment, the lens pattern may be formed on a light-exiting surface of the second area.

In an exemplary embodiment, the lens pattern may be formed on both a light-exiting surface and a light-incident surface of the second area.

In an exemplary embodiment, both the prism pattern and the diffusion member may be formed in a third area of the base film that is disposed between the first area and the second area.

In an exemplary embodiment, the first area may be wider than the second area.

In an exemplary embodiment of a backlight assembly according to the disclosure, the backlight assembly includes a light source emitting light, a light guide plate transmitting the light from the light source, and an optical sheet. The optical sheet includes a base film disposed on the light guide plate, a prism pattern formed in a first area of the base film, and a diffusion member formed in a second area of the base film. The prism pattern has a plurality of parallel prisms on a light exiting surface of the first area.

In an exemplary embodiment, the diffusion member may include a lens pattern having a plurality of irregularly arranged lenses.

In an exemplary embodiment, the lens pattern may be formed on a light-incident surface of the second area, and the prism pattern may be formed on the light-exiting surface of the second area.

In an exemplary embodiment, the lens pattern is formed on a light-exiting surface of the second area.

In an exemplary embodiment, the lens pattern may be formed on both a light-incident surface and a light-exiting surface of the second area.

In an exemplary embodiment, the diffusion member may include a plurality of scattering members within the base film that are configured to scatter incident light.

In an exemplary embodiment, the base film may further comprise a third area between the first area and the second area having both the prism pattern and the diffusion member.

In an exemplary embodiment, the second area may be disposed closer to the light source than the first area.

In another exemplary embodiment of an optical sheet according to the disclosure, the optical sheet includes a base film, a prism pattern formed on a light-exiting surface in a first area of the base film, and a diffusion member formed in a second area of the base film. The prism pattern includes a plurality of parallel prisms, and the diffusion member has a lens pattern having a plurality of irregularly arranged lenses.

In an exemplary embodiment, the lens pattern may be formed on a light-incident surface of the second area, and the prism pattern may be formed on the light-exiting surface of the second area.

In an exemplary embodiment, the lens pattern may be formed on a light-exiting surface of the second area.

In an exemplary embodiment, the lens pattern may be formed on both a light-exiting surface and a light-incident surface of the second area.

In an exemplary embodiment, the diffusion member may further include a plurality of scattering members within the base film configured to scatter incident light.

According to one or more exemplary embodiments of an optical sheet and a backlight assembly having the optical sheet, a prism pattern having a plurality of prisms is formed on a portion of the optical sheet and a lens pattern including a plurality of lenses is formed on another portion of the optical sheet, to reduce light-leakage and hot spots around light sources. In addition, a backlight assembly includes the optical sheet having both the prism pattern and the lens pattern to direct light from the light source toward the display panel without additional prism sheets, resulting in a simpler manufacturing processes and a reduced manufacturing cost for the backlight assembly.

DETAILED DESCRIPTION

Hereinafter, exemplary embodiments of the disclosure will be described in further detail with reference to the accompanying drawings.

Figure 1:
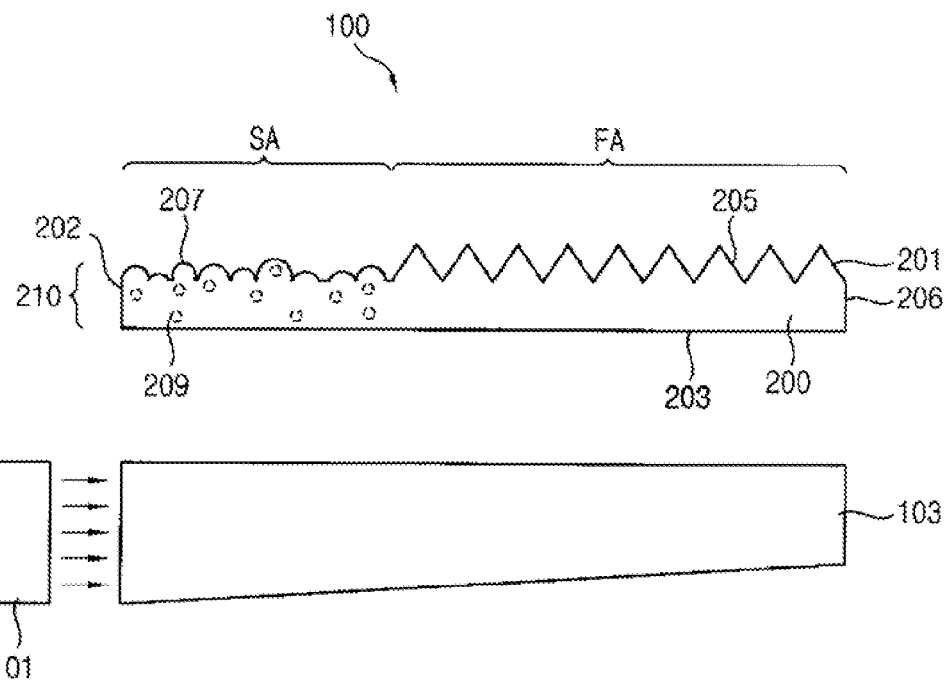
FIG. 1 is a cross-sectional view of a backlight assembly according to an exemplary embodiment of the disclosure.
Figure 2:
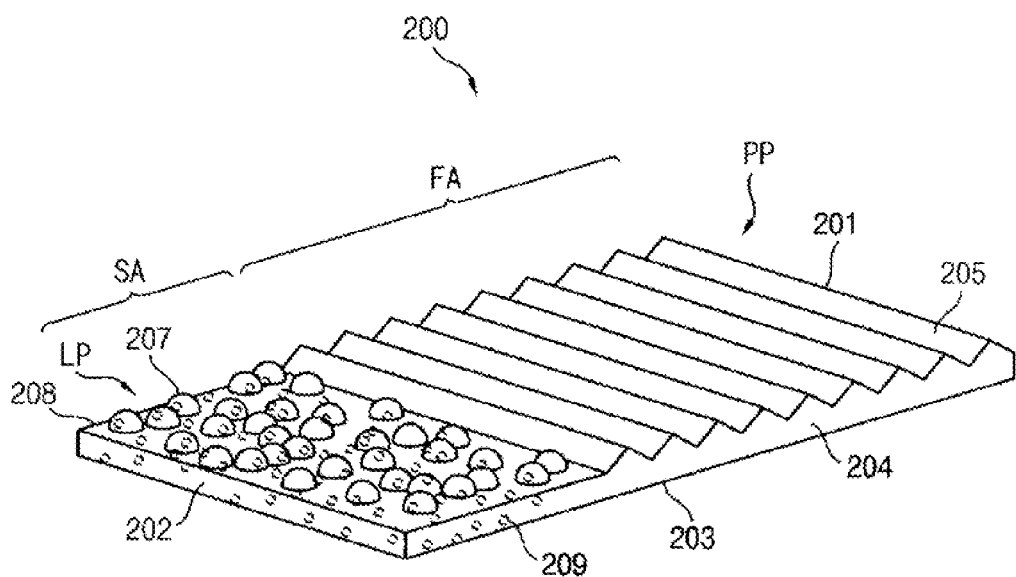
FIG. 2 is a perspective view illustrating an optical sheet of FIG. 1.

FIG. 1 is a cross-sectional view of a backlight assembly according to an exemplary embodiment of the disclosure. FIG. 2 is a perspective view illustrating an optical sheet of FIG. 1.

Referring to FIGS. 1 and 2, a backlight assembly 100 according to the present embodiment includes a light source 101, a light guide plate 103, and an optical sheet 200. The optical sheet 200 includes a base film 210, a prism pattern PP formed on the base film 210, and a diffusion member. The diffusion member includes a plurality of scattering members 209 or a lens pattern LP having a desired convex pattern. Although not shown, an additional diffusion sheet may be disposed between the light guide plate 103 and the optical sheet 200.

The light source 101 is disposed adjacent to a side surface of the light guide plate 103. The light source 101 emits light toward the light guide plate 103. For example, the light source 101 may include a plurality of light emitting diodes ("LEDs").

The light guide plate 103 guides light from the light source 101 to propagate upward. The light guide plate 103 includes an upper surface through which light is emitted, and a lower surface opposite to the upper surface. The lower surface may include a reflection member to reflect light. The lower surface may be tilted to a desired angle with respect to the upper surface. A material to form the light guide plate 103 may include polymethyl methacrylate ("PMMA").

The optical sheet 200 includes a first area FA and a second area SA. In addition, the optical sheet 200 includes a light incident surface 203, a light exiting surface 201 facing the light incident surface 203, and a plurality of side surfaces 202, 204, 206, 208 that connect the light incident surface 203 and the light exiting surface 201.

The first area FA includes the prism pattern PP in which a plurality of prisms 205 are formed. The prisms 205 may be arranged parallel to one of the side surfaces 202, 204, 206, 208. The prism pattern PP has a predetermined pitch and phase to concentrate upward the light incident from the light incident surface 203. Although the prisms 205 of the prism pattern PP are illustrated as having trigonal shapes, the shape of the prisms is not limited thereto.

The second area SA includes the diffusion member that diffuses the light from the light guide plate 103. The diffusion member includes scattering members 209 that scatter light or a lens pattern LP having a plurality of lenses 207. The scattering members 209 may include a silicon compound such as silicon oxide $SiO_2$. The lenses 207 may be irregularly arranged in the second area SA. Each of the lenses 207 has a predetermined curvature to diffuse light being emitted through the light exiting surface 201. The curvatures of the lenses 207 may be the same as or different from one another. In a present embodiment of the disclosure, the scattering members 209 are disposed corresponding to the lens pattern LP. That is, the scattering members 209 are disposed in the second area SA in which the lens pattern LP is formed.

In the present embodiment of the disclosure, the second area SA on which the lens pattern LP is disposed closer to the light source 101 than the first area FA on which the prism pattern PP is disposed. That is, the second area SA is disposed between the light source 101 and the first area FA when viewed from above the backlight assembly 100. According to embodiments, the first area FA may be wider than the second area SA, and the second area SA may border a side surface 202 of the base film 210. As mentioned above, as the diffusion member included in the optical sheet 200 is disposed closer to the light source 101, light-leakage and hot spots around the light source 101 may be reduced.

Figure 3:
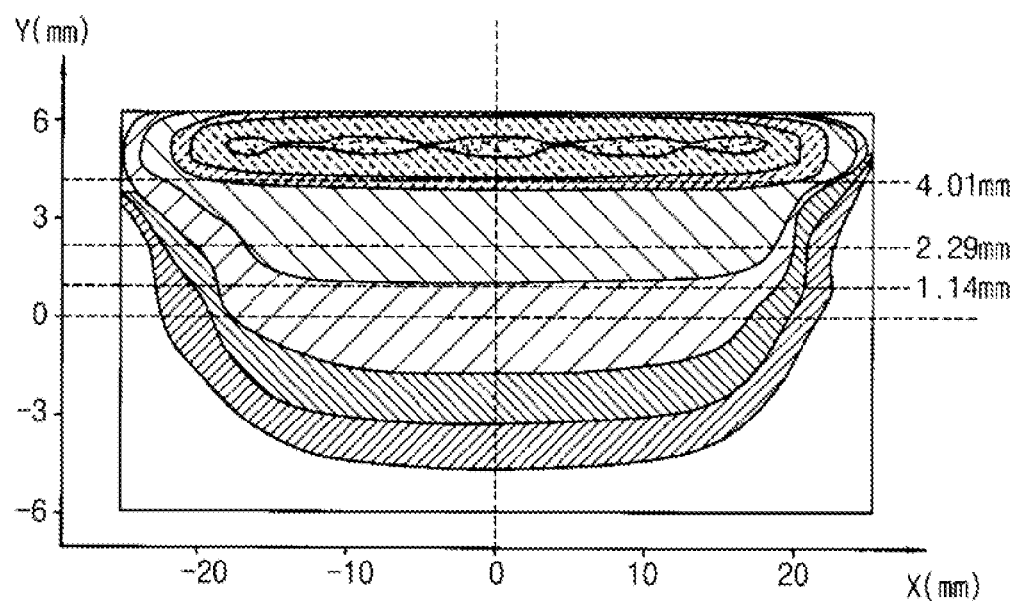
FIG. 3 is a plan view illustrating light distribution on an optical sheet according to an exemplary embodiment of the disclosure.
Figure 4A:
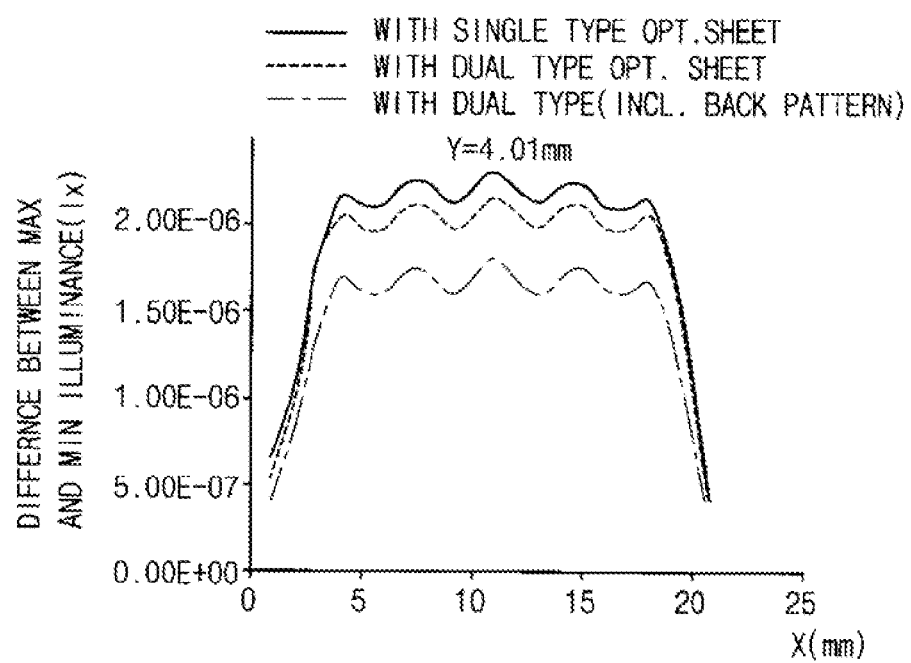
FIGS. 4A to 4C are graphs illustrating a difference between maximum luminance and minimum luminance in a light distribution of FIG. 3.
Figure 4B:
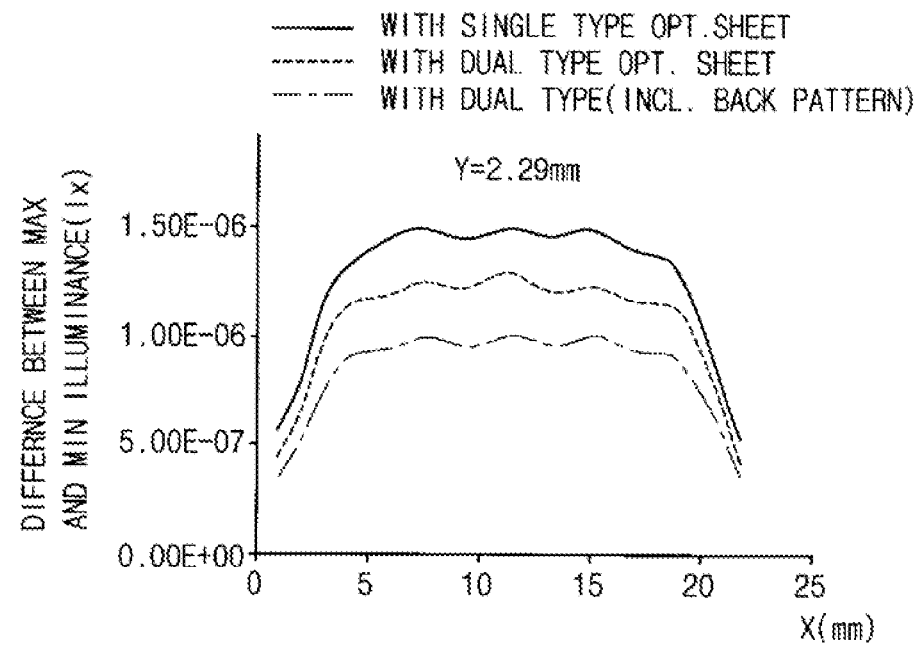
Figure 4C:
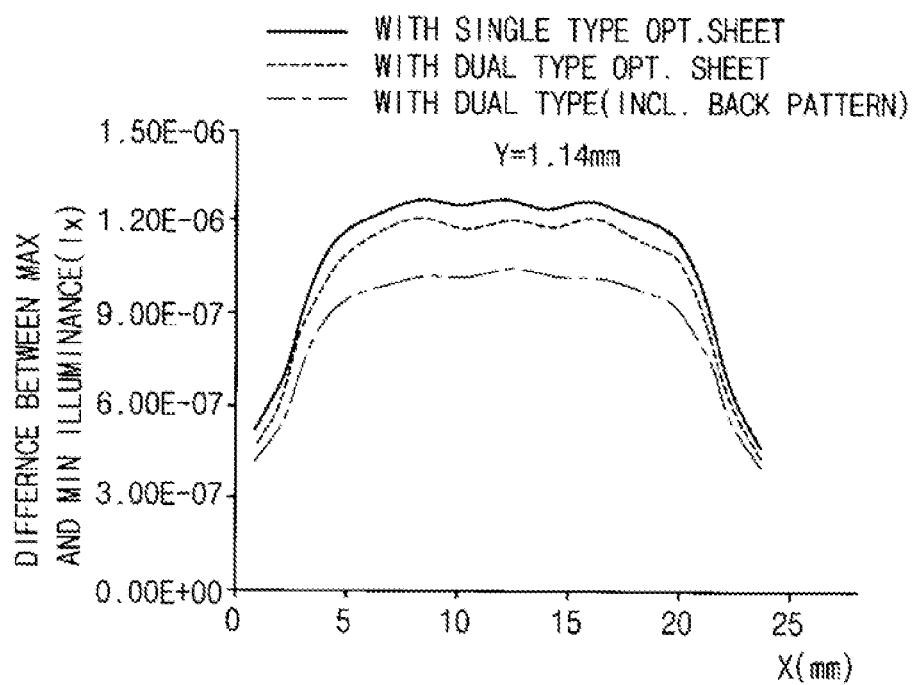

FIG. 3 is a plan view illustrating light distribution on an optical sheet according to an exemplary embodiment of the disclosure. FIGS. 4A to 4C are graphs illustrating a difference between maximum luminance and minimum luminance in a light distribution of FIG. 3.

More specifically, as illustrated in FIG. 3, a center of the optical sheet is located at (0, 0) while the optical sheet has a width of more than 40 millimeters along an X-axis and a length of more than 12 millimeters along a Y-axis. In addition, a plurality of light sources are disposed and overlapped on a portion of the optical sheet along a straight line paralleling the X-axis from (−17, 5) to (17, 5).

FIGS. 4A to 4C are graphs illustrating differences between maximum luminance and minimum luminance of the light distribution along lines parallel to the X-axis and displaced from the center by Y=4.01 millimeters, Y=2.29 millimeters, and Y=1.14 millimeters, respectively. In the graphs illustrated in FIGS. 4A to 4C, a solid line represents the luminance difference when an optical sheet including only the prism pattern is used, a dotted line represents the luminance difference when an optical sheet including both the prism pattern and the diffusion member is used, and a dash-dot line represents the luminance difference when an optical sheet including both the prism pattern and the diffusion member is used when the diffusion member is further included on the light incident surface 203.

Referring to FIGS. 3, 4A to 4C, the luminance difference between maximum luminance and minimum luminance is more noticeable at a portion closer to the light sources. In detail, referring to FIG. 4A, the luminance difference at portions of the optical sheet corresponding to the light sources (i.e., peaks in the graphs) is relatively greater than the luminance difference at portions of the optical sheet corresponding to areas among the light sources (i.e., valleys in the graphs). In addition, these peaks and valleys in the graphs result in noticeable hot spots. In particular, the hot spots are conspicuous when using an optical sheet that includes only a prism pattern. However, the hot spots are reduced when using an optical sheet that including both a prism pattern and a diffusion member.

Referring to FIG. 4B, the overall luminance difference between maximum luminance and minimum luminance is reduced with respect to the luminance difference illustrated in FIG. 4A as a distance from the light sources is greater in FIG. 4B. However, the overall tendency represented by the luminance difference of each of the optical sheets is maintained. That is, the luminance difference is relatively high when using an optical sheet that includes only a prism pattern. In contrast, the luminance differences are relatively low when using an optical sheet that includes both a prism pattern and a diffusion member.

Referring to FIG. 4C, the overall luminance difference between maximum luminance and minimum luminance is further reduced with respect to the luminance differences illustrated in FIG. 4B as a distance from the light sources is greater in FIG. 4C. However, the overall tendency represented by the luminance difference of each of the optical sheets is maintained. That is, the luminance differences are relatively high when using an optical sheet that includes only a prism pattern. In contrast, the luminance differences are relatively low when using an optical sheet that includes both a prism pattern and a diffusion member.

As mentioned above, the optical sheet 200 according to ae present embodiment includes a prism pattern having a plurality of prisms in the first area and a diffusion member in the second area, to reduce hot spots and light-leakage around the light sources. In addition, the backlight assembly 100 according to a present embodiment includes an optical sheet having both a prism pattern and a diffusion member, to concentrate light from the light sources upward without an additional prism sheet, which results in a simpler manufacturing process and reduced manufacturing cost for the backlight assembly.

Figure 5:
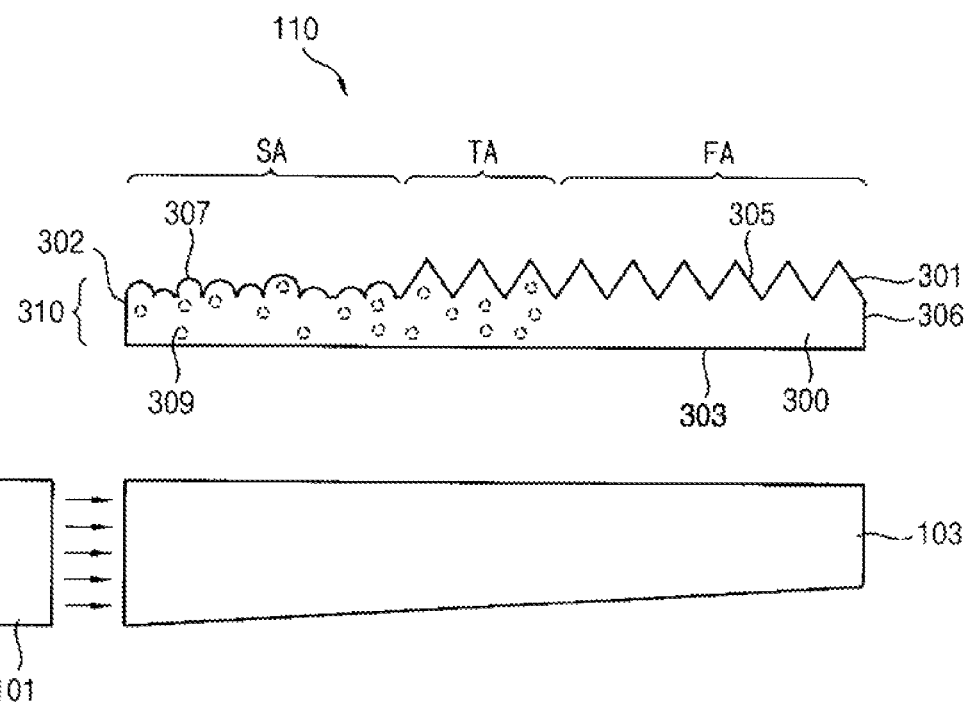
FIG. 5 is a cross-sectional view of a backlight assembly according to another exemplary embodiment of the disclosure.
Figure 6:
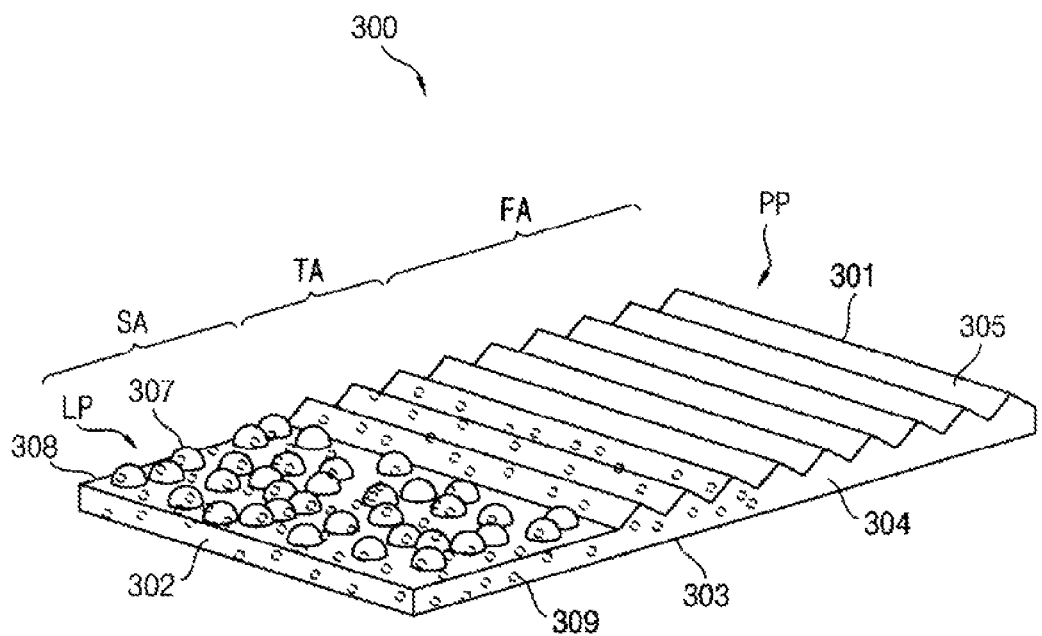
FIG. 6 is a perspective view illustrating an optical sheet of FIG. 5.

FIG. 5 is a cross-sectional view of a backlight assembly according to another exemplary embodiment of the disclosure. FIG. 6 is a perspective view illustrating an optical sheet of FIG. 5.

Referring to FIGS. 5 and 6, a backlight assembly 110 according to the present embodiment includes a light source 101, a light guide plate 103, and an optical sheet 300. The optical sheet 300 includes a base film 310, a prism pattern PP formed on the base film 310, and a diffusion member. The diffusion member includes a plurality of scattering members 309 or a lens pattern LP having a desired convex pattern. Although not shown, an additional diffusion sheet may be disposed between the light guide plate 103 and the optical sheet 300.

The light source 101 is disposed adjacent to a side surface of the light guide plate 103. The light source 101 emits light toward the light guide plate 103. For example, the light source 101 may include a plurality of LEDs.

The light guide plate 103 guides light from the light source 101 to propagate upward. The light guide plate 103 includes an upper surface through which light is emitted and a lower surface facing the upper surface. The lower surface may include a reflection member to reflect light. The lower surface may be tilted to a desired angle with respect to the upper surface. A material to form the light guide plate 103 may include PMMA.

The optical sheet 300 includes a first area FA, a second area SA, and a third area TA. In addition, the optical sheet 300 further includes a light incident surface 303, a light exiting surface 301 facing the light incident surface 303, and a plurality of side surfaces 302, 304, 306, 308 that connect the light incident surface 303 and the light exiting surfaces 301. The scattering members 309 in the optical sheet 300 may include a silicon compound such as silicon oxide $SiO_2$. The optical sheet 300 according to a present embodiment is substantially the same as the optical sheet illustrated in FIGS. 1 and 2 except for the area on which the scattering members 309 are disposed.

The first area FA includes a prism pattern PP having a plurality of prisms. The prisms 305 may be arranged parallel to one of the side surfaces 302, 304, 306, 308. The prism pattern PP has a pitch and a phase to concentrate upward the light incident from the light incident surface 303. Although the prisms 305 of the prism pattern PP are illustrated as having trigonal shapes, the shape of the prisms is not limited thereto.

The second area SA includes the diffusion member that diffuses the light from the light guide plate 103. The diffusion member includes scattering members 309 that scatter the light or a lens pattern LP having a plurality of lenses 307. The lenses 307 may be irregularly arranged in the second area SA. Each of the lenses 307 has a desired curvature to diffuse the light being emitted through the light exiting surface 301. The curvatures of the lenses 307 may be the same as or different from one another. The scattering members 309 and the lens pattern LP improve light uniformity around the light sources 101 when light is emitted through the light exiting surface 301. In a present embodiment of the disclosure, the second area SA on which the lens pattern LP is formed is adjacent to the light source 101. According to embodiments, the first area FA may be wider than the second area SA, and the second area SA may border a side surface 302 of the base film 310.

The diffusion member and the prism pattern PP are combined in the third area TA of the optical sheet 300. The diffusion member in the third area TA includes the scattering members 309. The prism pattern PP is formed on the light exiting surface 301 of the third area TA.

In a present embodiment of the disclosure, the second area SA is disposed between the light source 101 and the third area TA. Accordingly, light-leakage and hot spots may be reduced around the light source 101 while reducing light diffusivity differences between the first area FA and the second area SA. For example, the light diffusivity may be highest in the second area SA, and lowest in the first area FA. Thus, disposing the third area TA between the first area FA and the second area SA may substantially eliminate a visible border area between the lens pattern LP and the prism pattern PP in the light distribution of the optical sheet 300.

As mentioned above, the optical sheet 300 according to a present embodiment includes a prism pattern including a plurality of prisms in the first area, a diffusion member including a lens pattern and scattering members in the second area, and both the prism pattern and the diffusion member in the third area, to reduce light-leakage and hot spots around the light source.

Figure 7:
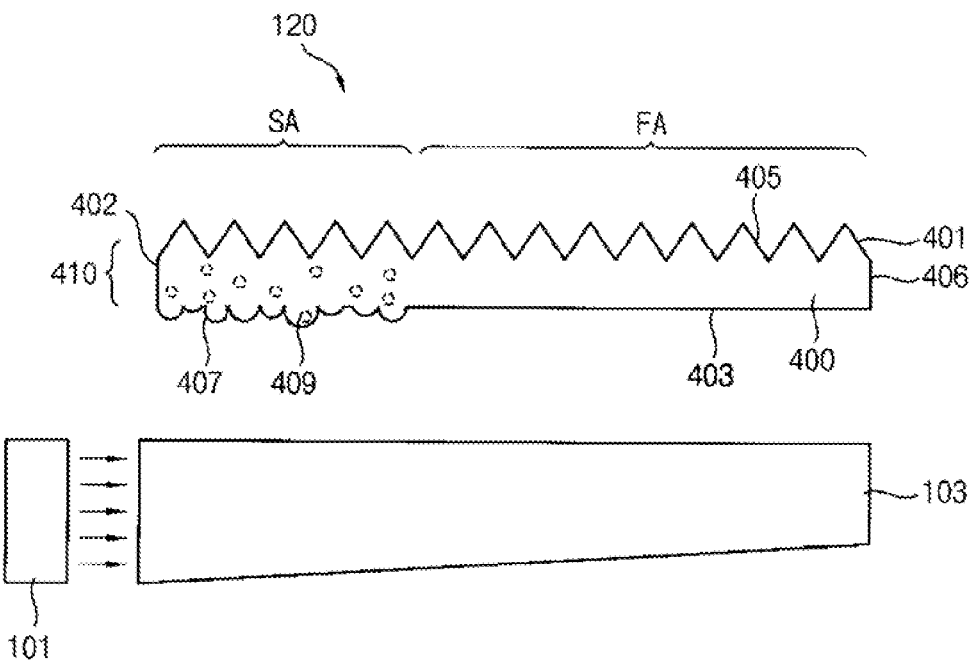
FIG. 7 is a cross-sectional view of a backlight assembly according to another exemplary embodiment of the disclosure.
Figure 8:
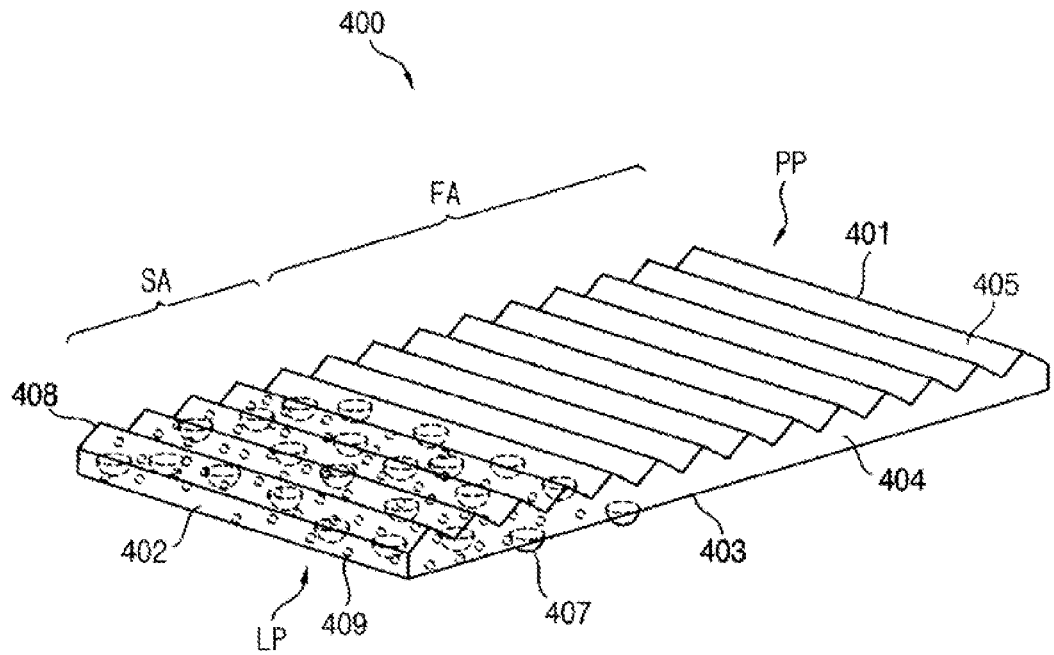
FIG. 8 is a perspective view illustrating an optical sheet of FIG. 7.

FIG. 7 is a cross-sectional view of a backlight assembly according to another exemplary embodiment of the disclosure. FIG. 8 is a perspective view illustrating an optical sheet of FIG. 7.

Referring to FIGS. 7 and 8, a backlight assembly 120 according to the present embodiment includes a light source 101, a light guide plate 103, and an optical sheet 400. The optical sheet 400 includes a base film 410, a prism pattern PP formed on the base film 410, and a diffusion member. The diffusion member includes a plurality of scattering members 409 or a lens pattern LP having a desired convex pattern. Although not shown, an additional diffusion sheet may be disposed between the light guide plate 103 and the optical sheet 400.

The light source 101 is disposed adjacent to a side surface of the light guide plate 103. The light source 101 emits light toward the light guide plate 103. For example, the light source 101 may include a plurality of LEDs.

The light guide plate 103 guides light from the light source 101 to propagate upward. The light guide plate 103 includes an upper surface through which light is emitted and a lower surface facing the upper surface. The lower surface may include a reflection member to reflect light. The lower surface may be tilted to a desired angle with respect to the upper surface. A material to form the light guide plate 103 may include PMMA.

The optical sheet 400 includes a first area FA and a second area SA. In addition, the optical sheet 400 further includes a light incident surface 403, a light exiting surface 401 facing the light incident surface 403, and a plurality of side surfaces 402, 404, 406, 408 that connect the light incident surface 403 and the light exiting surfaces 401. The scattering members 409 in the optical sheet 400 may include a silicon compound such as silicon oxide $SiO_2$.

The first area FA includes the prism pattern PP having a plurality of prisms 405. The prisms 405 may be arranged parallel to one of the side surfaces 402, 404, 406, 408. The prism pattern PP has a pitch and a phase to concentrate upward the light incident from the light incident surface 403. Although the prisms 405 of the prism pattern PP are illustrated as having trigonal shapes, the shape of the prisms is not limited thereto.

The second area SA includes the diffusion member and the prism pattern PP. The prism pattern PP is disposed on the light exiting surface 401 in the second area SA. The diffusion member includes the scattering members 409 or a lens pattern LP having a plurality of lenses 407. The lens pattern LP is disposed on a rear surface of the optical sheet 400. That is, the lens pattern LP is disposed on the light incident surface 403 in the second area SA. The lenses 407 may be irregularly arranged on the light incident surface 403. Each of the lenses 407 has a desired curvature to diffuse the light being emitted through the light exiting surface 401. The curvatures of the lenses 407 may be the same as or different from one another. In a present embodiment of the disclosure, the second area SA is adjacent to the light source 101. The scattering members 409 may be disposed corresponding to the lens pattern LP in the second area SA. According to embodiments, the first area FA may be wider than the second area SA, and the second area SA may border a side surface 402 of the base film 410.

As mentioned above, the optical sheet 400 according to a present embodiment includes a prism pattern having a plurality of prisms on a surface and a diffusion member, i.e., the scattering members and the lens pattern on a surface facing the surface with the prism pattern, to reduce light-leakage and hot spots around the light source.

Figure 9:
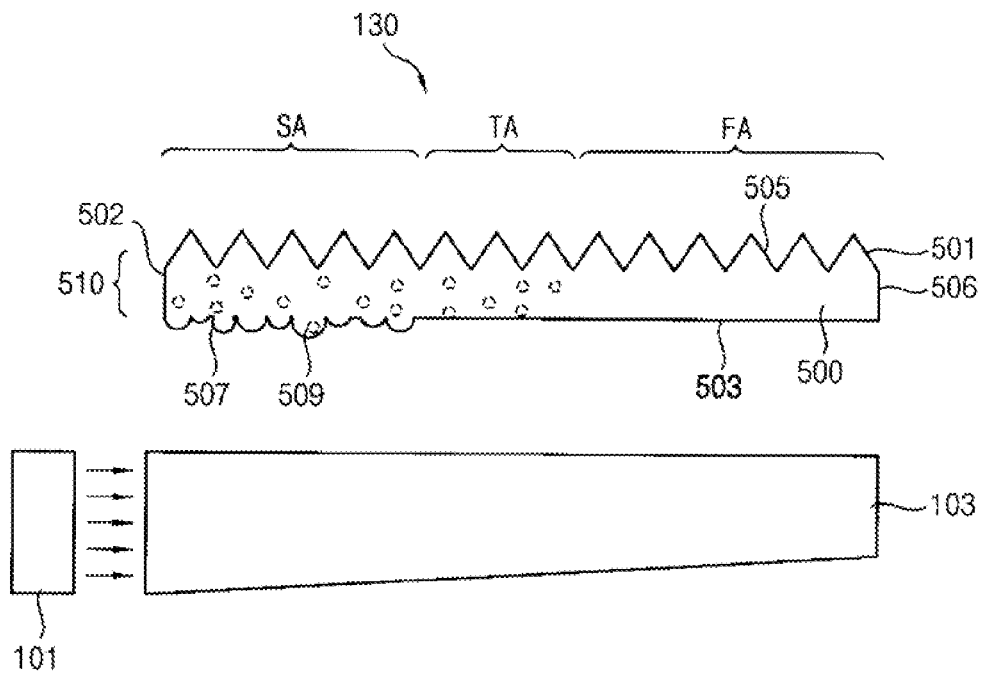
FIG. 9 a cross-sectional view of a backlight assembly according to another exemplary embodiment of the disclosure.
Figure 10:
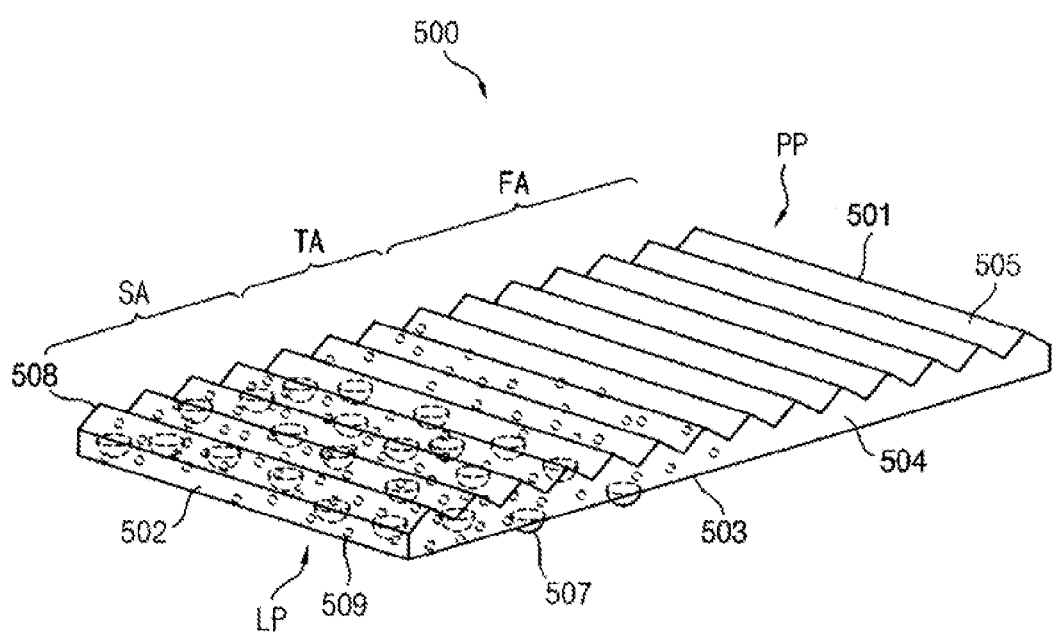
FIG. 10 is a perspective view illustrating an optical sheet of FIG. 9.

FIG. 9 a cross-sectional view of a backlight assembly according to another exemplary embodiment of the disclosure. FIG. 10 is a perspective view illustrating an optical sheet of FIG. 9.

Referring to FIGS. 9 and 10, a backlight assembly 130 according to the present embodiment includes a light source 101, a light guide plate 103, and an optical sheet 500. The optical sheet 500 includes a base film 510, a prism pattern PP formed on the base film 510, and a diffusion member. The diffusion member includes a plurality of scattering members 509 or a lens pattern LP having a desired convex pattern. Although not shown, an additional diffusion sheet may be disposed between the light guide plate 103 and the optical sheet 500.

The light source 101 is disposed adjacent to a side surface of the light guide plate 103. The light source 101 emits light toward the light guide plate 103. For example, the light source 101 may include a plurality of LEDs.

The light guide plate 103 guides the light from the light source 101 to propagate upward. The light guide plate 103 includes an upper surface through which light is emitted and a lower surface facing the upper surface. The lower surface may include a reflection member to reflect light. The lower surface may be tilted to a desired angle with respect to the upper surface. A material to form the light guide plate 103 may include PMMA.

The optical sheet 500 includes a first area FA, a second area SA, and a third area TA. In addition, the optical sheet 500 further includes a light incident surface 503, a light exiting surface 501 facing the light incident surface 503, and a plurality of side surfaces 502, 504, 506, 508 that connect the light incident surface 503 and the light exiting surfaces 501. The scattering members 509 in the optical sheet 500 may include a silicon compound such as silicon oxide $SiO_2$. The optical sheet 500 according to a present embodiment is substantially the same as the optical sheet illustrated in FIGS. 7 and 8 except for the area on which the scattering members 509 are disposed.

The first area FA includes the prism pattern PP having a plurality of prisms. The prisms 505 may be arranged parallel to one of the side surfaces 502, 504, 506, 508. The prism pattern PP has a pitch and a phase to concentrate upward light incident from the light incident surface 503. Although the prisms 505 of the prism pattern PP are illustrated as having trigonal shapes, the shape of the prisms is not limited thereto.

The second area SA includes the diffusion member and the prism pattern PP. The prism pattern PP is disposed on the light exiting surface 501 in the second area SA. The diffusion member includes the scattering members 509 or a lens pattern LP having a plurality of lenses 507. The lens pattern LP is disposed on a rear surface of the optical sheet 500. That is, the lens pattern LP is disposed on the light incident surface 503 in the second area SA. The lenses 507 may be irregularly arranged on the light incident surface 503. Each of the lenses 507 has a desired curvature to diffuse light being emitted through the light exiting surface 501. The curvatures of the lenses 507 may be the same as or different from one another. In a present embodiment of the disclosure, the second area SA is adjacent to the light source 101. According to embodiments, the first area FA may be wider than the second area SA, and the second area SA may border a side surface 502 of the base film 510.

Both the diffusion member and the prism pattern PP are disposed in the third area TA of the optical sheet 500. The diffusion member in the third area TA includes the scattering members 509. The prism pattern PP is formed on the light exiting surface 501 of the third area TA.

In a present embodiment of the disclosure, the second area SA is disposed between the light source 101 and the third area TA. Accordingly, light-leakage and hot spots may be reduced around the light source 101 while reducing light diffusivity differences between the first area FA and the second area SA. For example, the light diffusivity may be highest in the second area SA, and lowest in the first area FA. Thus, disposing the third area TA between the first area FA and the second area SA, may substantially eliminate a visible border area between the lens pattern LP and the prism pattern PP in the light distribution of the optical sheet 500.

As mentioned above, the optical sheet 500 according to a present embodiment includes a prism pattern having the plurality of prisms on a surface and a diffusion member, i.e., the scattering members and the lens pattern on a surface facing the surface with the prism pattern, to reduce light-leakage and hot spots around the light source.

Figure 11:
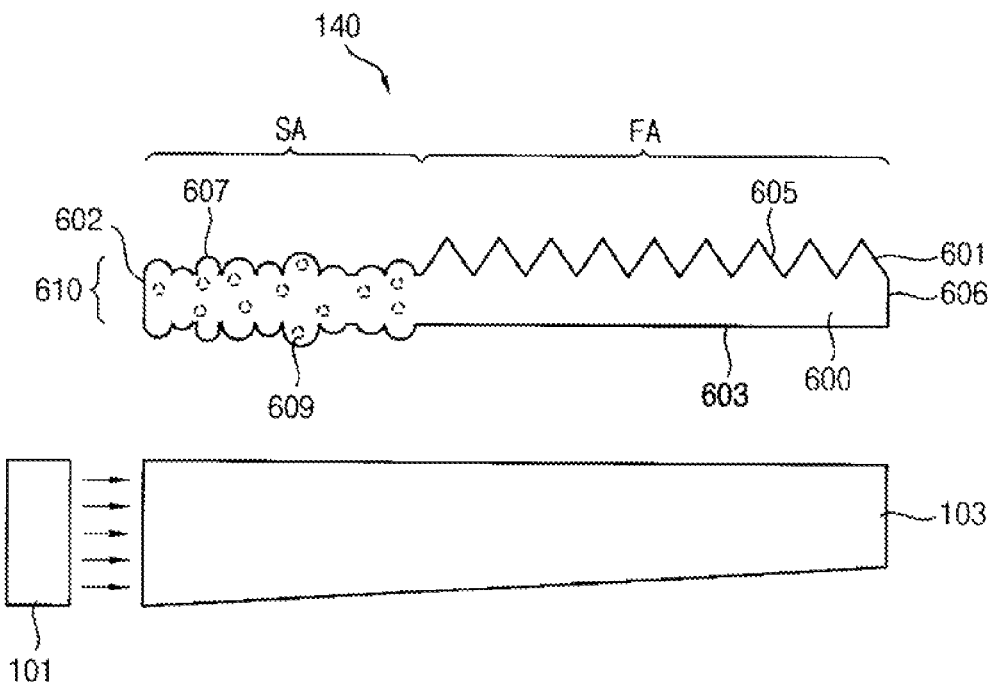
FIG. 11 is a cross-sectional view of a backlight assembly according to another exemplary embodiment of the disclosure.
Figure 12:
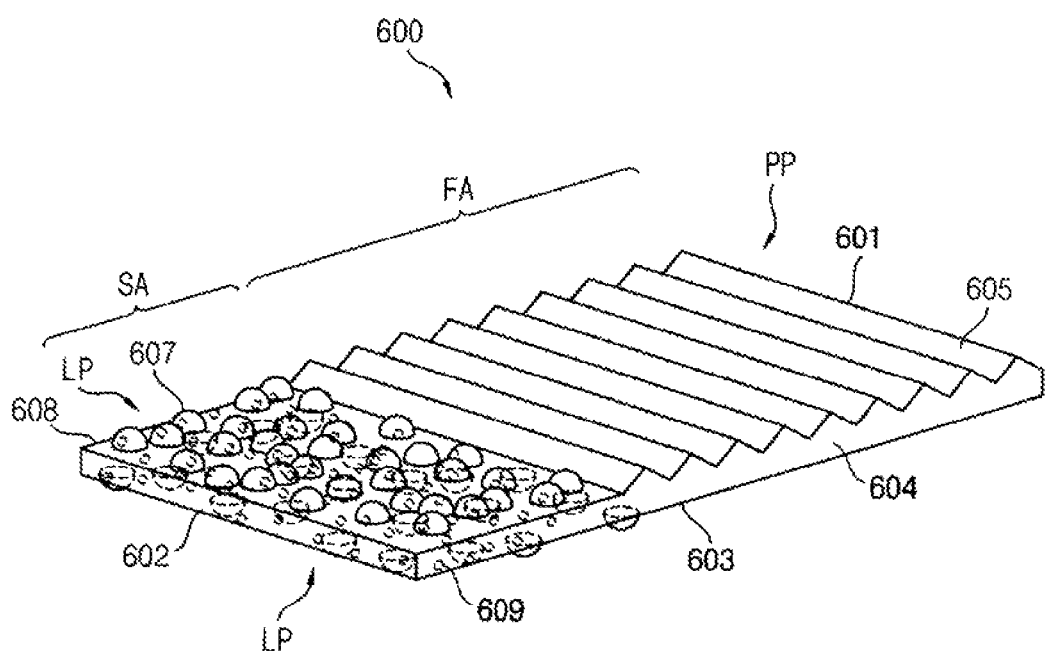
FIG. 12 is a perspective view illustrating an optical sheet of FIG. 11.

FIG. 11 is a cross-sectional view of a backlight assembly according to another exemplary embodiment of the disclosure. FIG. 12 is a perspective view illustrating an optical sheet of FIG. 11.

Referring to FIGS. 11 and 12, a backlight assembly 140 according to the present embodiment includes a light source 101, a light guide plate 103, and an optical sheet 600. The optical sheet 600 includes a base film 610, a prism pattern PP formed on the base film 610, and a diffusion member. The diffusion member includes a plurality of scattering members 609 or a lens pattern LP having a desired convex pattern. Although not shown, an additional diffusion sheet may be disposed between the light guide plate 103 and the optical sheet 600.

The light source 101 is disposed adjacent to a side surface of the light guide plate 103. The light source 101 emits light toward the light guide plate 103. For example, the light source 101 may include a plurality of LEDs.

The light guide plate 103 guides the light from the light source 101 to propagate upward. The light guide plate 103 includes an upper surface through which light is emitted and a lower surface facing the upper surface. The lower surface may include a reflection member to reflect light. The lower surface may be tilted to a desired angle with respect to the upper surface. A material to form the light guide plate 103 may include PMMA.

The optical sheet 600 includes a first area FA and a second area SA. In addition, the optical sheet 600 further includes a light incident surface 603, a light exiting surface 601 facing the light incident surface 603, and a plurality of side surfaces 602, 604, 606, 608 that connect the light incident surface 603 and the light exiting surfaces 601. The scattering members 609 in the optical sheet 600 may include a silicon compound such as silicon oxide $SiO_2$.

The first area FA includes the prism pattern PP having a plurality of prisms 605. The prisms 605 may be arranged parallel to one of the side surfaces 602, 604, 606, 608. The prism pattern PP has a pitch and a phase to concentrate upward light incident from the light incident surface 603. Although the prisms 605 of the prism pattern PP are illustrated as having trigonal shapes, the shape of the prisms is not limited thereto.

The second area SA includes the diffusion member. The diffusion member includes the scattering members 609 or a lens pattern LP having a plurality of lenses 607. The lens pattern LP is disposed both on a front surface and a rear surface of the optical sheet 600. That is, the lens pattern LP is disposed both on the light exiting surface 601 and the light incident surface 603 of the second area SA. The lenses 607 may be irregularly arranged on both the light exiting surface 601 and the light incident surface 603. Each of the lenses 607 has a desired curvature to diffuse light being emitted through the light exiting surface 601. The curvatures of the lenses 607 may be the same as or different from one another. The scattering members 609 may be disposed corresponding to the lens pattern LP in the second area SA.

In a present embodiment of the disclosure, the second area SA is adjacent to the light source 101. According to embodiments, the first area FA may be wider than the second area SA, and the second area SA may border a side surface 602 of the base film 610.

As mentioned above, the optical sheet 600 according to a present embodiment includes a prism pattern having a plurality of prisms in the first area and a diffusion member having a lens pattern on both the front surface and the rear surface in the second area, to reduce hot spots and light-leakage around the light sources.

Figure 13:
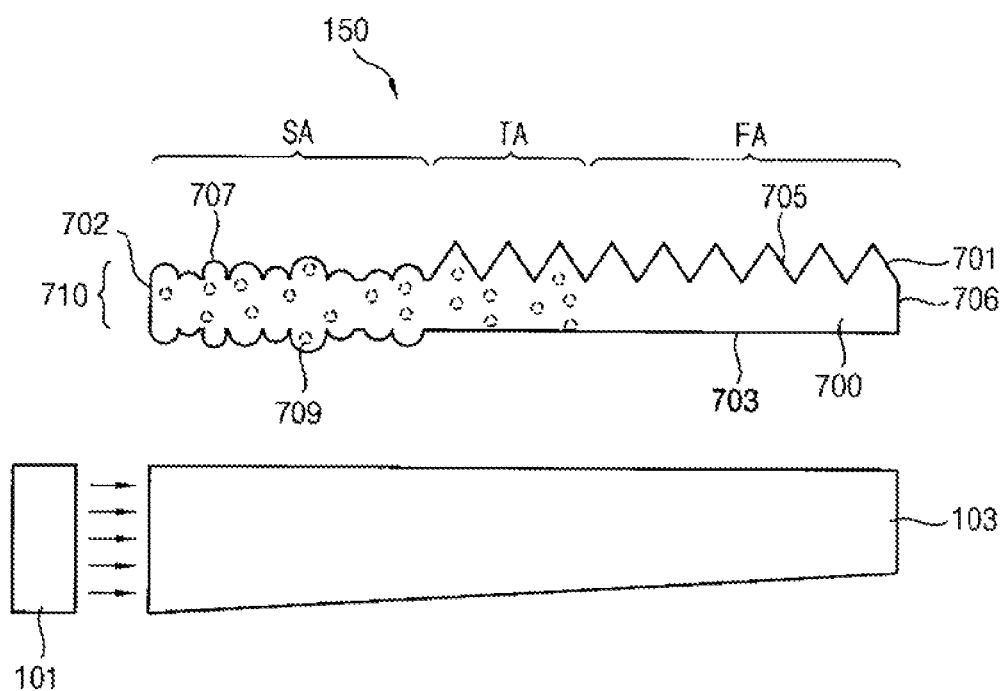
FIG. 13 is a cross-sectional view of a backlight assembly according to a another exemplary embodiment of the disclosure.
Figure 14:
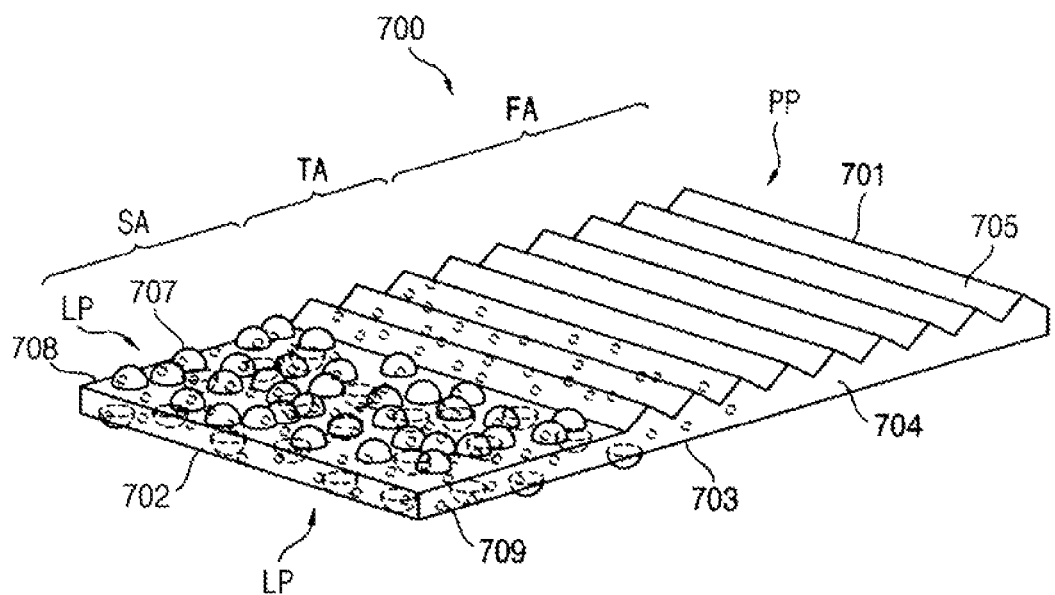
FIG. 14 is a perspective view illustrating an optical sheet of FIG. 13.

FIG. 13 is a cross-sectional view of a backlight assembly according to another exemplary embodiment of the disclosure. FIG. 14 is a perspective view illustrating an optical sheet of FIG. 13.

Referring to FIGS. 13 and 14, a backlight assembly 150 according to the present embodiment includes a light source 101, a light guide plate 103, and an optical sheet 700. The optical sheet 700 includes a base film 710, a prism pattern PP formed on the base film 710, and a diffusion member. The diffusion member includes a plurality of scattering members 709 or a lens pattern LP having a desired convex pattern. Although not shown, an additional diffusion sheet may be disposed between the light guide plate 103 and the optical sheet 700.

The light source 101 is disposed adjacent to a side surface of the light guide plate 103. The light source 101 emits light toward the light guide plate 103. For example, the light source 101 may include a plurality of LEDs.

The light guide plate 103 guides the light from the light source 101 to propagate upward. The light guide plate 103 includes an upper surface through which light is emitted and a lower surface facing the upper surface. The lower surface may include a reflection member to reflect light. The lower surface may be tilted to a desired angle with respect to the upper surface. A material to form the light guide plate 103 may include PMMA.

The optical sheet 700 includes a first area FA, a second area SA, and a third area TA. In addition, the optical sheet 700 further includes a light incident surface 703, a light exiting surface 701 facing the light incident surface 703, and a plurality of side surfaces 702, 704, 706, 708 that connect the light incident surface 703 and the light exiting surfaces 701. The scattering members 709 in the optical sheet 700 may include a silicon compound such as silicon oxide $SiO_2$. The optical sheet 700 according to a present embodiment is substantially the same as the optical sheet illustrated in FIGS. 11 and 12 except for the area on which the scattering members 709 are disposed.

The first area FA includes the prism pattern PP having a plurality of prisms. The prisms 705 may be arranged parallel to one of the side surfaces 702, 704, 706, 708. The prism pattern PP has a pitch and a phase to concentrate upward light incident from the light incident surface 703. Although the prisms 705 of the prism pattern PP are illustrated as having trigonal shapes, the shape of the prisms is not limited thereto.

The second area SA includes the diffusion member. The diffusion member includes the scattering members 709 or a lens pattern LP having a plurality of lenses 707. The lens pattern LP is disposed on both a front surface and a rear surface of the optical sheet 700. That is, the lens pattern LP is disposed on both the light exiting surface 701 and the light incident surface 703 in the second area SA. The lenses 707 may be irregularly arranged on both the light exiting surface 701 and the light incident surface 703. Each of the lenses 707 has a desired curvature to diffuse light being emitted through the light exiting surface 701. The curvatures of the lenses 707 may be the same as or different from one another. In a present embodiment of the disclosure, the second area SA is adjacent to the light source 101. According to embodiments, the first area FA may be wider than the second area SA, and the second area SA may border a side surface 702 of the base film 710.

Both the diffusion member and the prism pattern PP are disposed in the third area TA of the optical sheet 700. The diffusion member in the third area TA includes the scattering members 709. The prism pattern PP is formed on the light exiting surface 701 of the third area TA.

In a present embodiment of the disclosure, the second area SA is disposed between the light source 101 and the third area TA. Accordingly, light-leakage and hot spots may be reduced around the light source 101 while reducing light diffusivity differences between the first area FA and the second area SA. For example, the light diffusivity may be highest in the second area SA, and lowest in the first area FA. Thus, disposing the third area TA between the first area FA and the second area SA may substantially eliminate a visible border area between the lens pattern LP and the prism pattern PP in a light distribution of the optical sheet 700.

As mentioned above, the optical sheet 700 according to a present embodiment includes a prism pattern including the plurality of prisms in the first area, a diffusion member including the lens pattern and the scattering members in the second area, and both the prism pattern and the diffusion member in the third area, to reduce light-leakage and hot spots around the light source.

What is claimed is:

1. A backlight assembly comprising:
   a light source;
   a light guide plate transmitting light from the light source, wherein the light source is adjacent to a side surface of the light guide plate; and
   an optical sheet comprising
      a base film on the light guide plate that is horizontally divided into a first area and a second area that do not overlap each other, wherein the second area is between the first area and the light source;
      a prism pattern on a light-exiting surface in the first area of the base film, the prism pattern comprising a plurality of prisms; and
      a diffusion member in the second area of the base film that comprises a plurality of scattering members within the base film configured to scatter incident light,
      wherein no scattering members are disposed in the first area.

2. The backlight assembly of claim 1, wherein the diffusion member further comprises a lens pattern having a plurality of irregularly arranged lenses.

3. The backlight assembly of claim 2, wherein the lens pattern overlaps with the second area on a light-incident surface of the base film, and the prism pattern overlaps with the second area on the light-exiting surface of the base film.

4. The backlight assembly of claim 2, wherein the lens pattern overlaps with the second area on the light-exiting surface of the base film.

5. The backlight assembly of claim 2, wherein the lens pattern overlaps with the second area both on the light-exiting surface and a light-incident surface of the base film.

6. The backlight assembly of claim 2, wherein no lenses are disposed in the first area.

7. The backlight assembly of claim 1, wherein both the prism pattern and the diffusion member overlap with a third area of the base film between the first area and the second area.

8. The backlight assembly of claim 1, wherein the first area is wider than the second area.

9. A backlight assembly comprising:
   a light source emitting light;
   a light guide plate transmitting the light from the light source, wherein the light source is adjacent to a side surface of the light guide plate; and
   an optical sheet comprising
      a base film comprising a light-incident surface and a light-exiting surface, the base film being horizontally divided into a first area and a second area that do not overlap each other, wherein the second area is between the first area and the light source;
      a prism pattern in the first area of the base film, the prism pattern having a plurality of parallel prisms on the light-exiting surface of the first area; and
      a diffusion member in the second area of the base film that comprises a lens pattern having a plurality of irregularly arranged lenses,
      wherein no lenses are disposed in the first area.

10. The backlight assembly of claim 9, wherein the first area is wider than the second area.

11. The backlight assembly of claim 9, wherein each of the lenses of the lens pattern has substantially different curvature from one another.

12. The backlight assembly of claim 9, wherein each of the lenses of the lens pattern has substantially the same curvature as one another.

13. The backlight assembly of claim 9, wherein the optical sheet further includes a plurality of scattering members within the base film.

14. The backlight assembly of claim 13, wherein a horizontal area in which the scattering members are distributed includes the second area.

15. The backlight assembly of claim 13, wherein the base film is subdivided into the first area, the second area and a third area between the first area and the second area in a horizontal direction, and
   wherein the scattering members overlap with the third area.

16. The backlight assembly of claim 13, wherein no scattering members are disposed in the first area.

17. The backlight assembly of claim 9, wherein the parallel prisms are arranged along a horizontal direction that separates the first area and the second area.

18. The backlight assembly of claim 9, wherein the optical sheet entirely overlaps with the light guide plate.

* * * * *